J. B. REPLOGLE.
REGULATING DEVICE.
APPLICATION FILED APR. 17, 1918.

1,398,648. Patented Nov. 29, 1921.
3 SHEETS—SHEET 1.

Witnesses

Inventor
James B. Replogle
By Kerr, Page, Cooper & Hayward
Attorneys

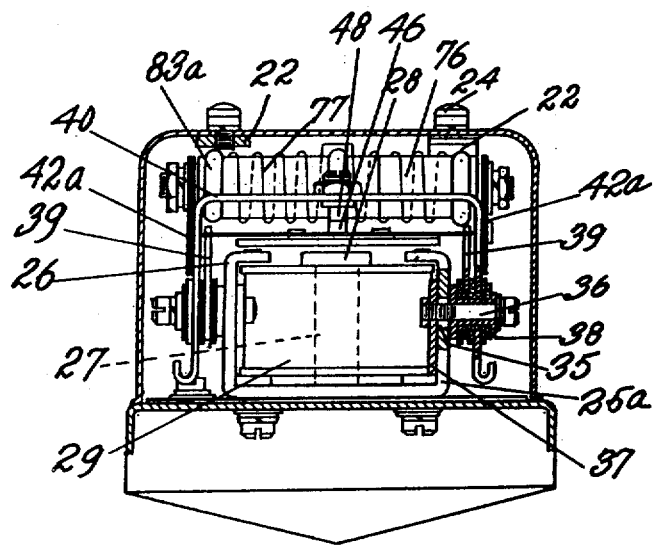
Fig. 5.
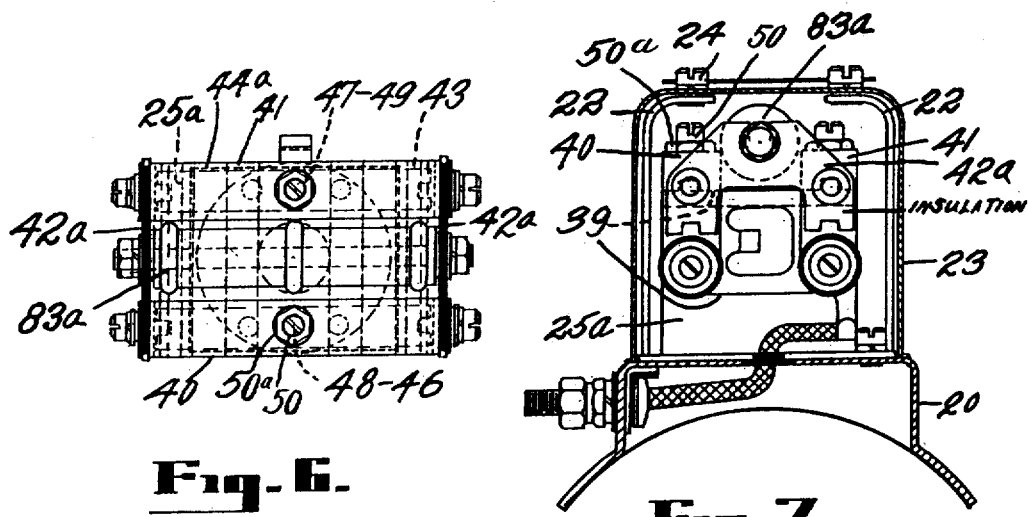
Fig. 6.
Fig. 7.

J. B. REPLOGLE.
REGULATING DEVICE.
APPLICATION FILED APR. 17, 1918.

1,398,648.

Patented Nov. 29, 1921.
3 SHEETS—SHEET 3.

Witnesses
Inventor
James B. Replogle
By Kenyon, Page, Cooper & Hayward
Attorneys

UNITED STATES PATENT OFFICE.

JAMES B. REPLOGLE, OF DETROIT, MICHIGAN, ASSIGNOR TO THE REMY ELECTRIC COMPANY, A CORPORATION OF INDIANA.

REGULATING DEVICE.

1,398,648.   Specification of Letters Patent.   Patented Nov. 29, 1921.

Application filed April 17, 1918. Serial No. 229,015.

*To all whom it may concern:*

Be it known that I, JAMES B. REPLOGLE, a citizen of the United States of America, residing at Detroit, in the county of Wayne and the State of Michigan, have invented certain new and useful Improvements in Regulating Devices, of which the following is a full, clear, and exact description.

This invention relates to devices for controlling electric circuits and particularly to devices for automatically controlling the output of a generator.

An object of the present invention resides in the provision of a controlling device of improved construction which will be very sensitive in operation, that is one which will rapidly respond to small fluctuations in the forces which effect the operation thereof.

Another object resides in the provision of a controlling device which will be practically constant in operation for all temperatures to which the device may be subjected.

Further objects and advantages of the present invention will be apparent from the following description of embodiments thereof, reference being made to the accompanying drawings.

In the drawings:

Fig. 5 is a front view of another form of the invention;

Fig. 6 is a plan view thereof;

Fig. 7 is an end view showing a section of the housing;

Figure 1:
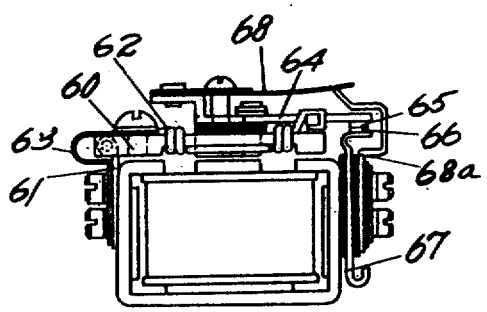
Figure 1 is a front view of a device embodying the invention.
Figure 2:
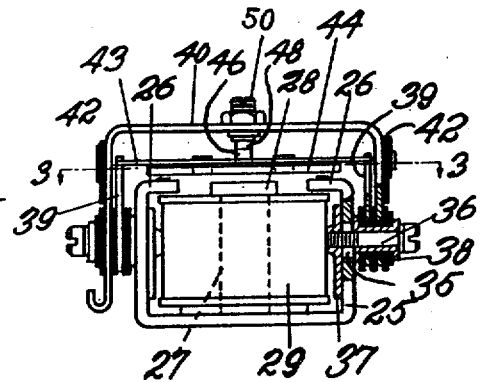
Fig. 2 is a rear view thereof.
Figure 3:
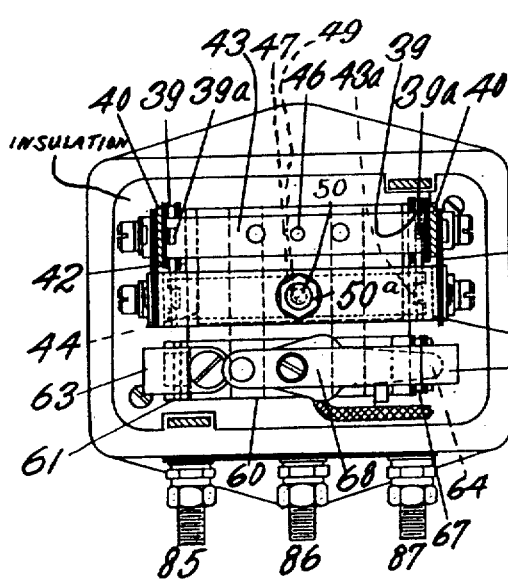
Fig. 3 is a plan view thereof showing the housing.

Referring to Figs. 1, 2, 3, 4 and 8, 20 designates a base adapted to be mounted upon a cylindrical surface, as a generator frame, and formed to provide a recess 21 for a purpose to be described, and carrying posts 22 to which housing 23 may be attached by means of screws 24.

Base 20 supports a U-shaped magnet frame 25 having pole pieces 26, and upon the base of frame 25 there is mounted a core 27 which terminates in a pole piece 28. A coil 29 is placed around the core and one end thereof is grounded at 30 (see Fig. 8) upon the pole piece 28, and the other end is connected with resistance element 31 composed of material which has practically uniform resistance for all temperatures. Element 31 is grounded upon any convenient conductor, as the frame of the generator to be described. The purpose of element 31 is to permit the use of a magnet coil 29 of small resistance so that variations in resistance due to changes in the temperature of coil 29 will be practically negligible, with the result that corresponding variations in current flowing through coils 29 and 31 will be very small, and the action of the controlling device will be practically constant.

Frame 25 is provided with slots 35 through which project bolts 36 engaging nuts 37. Bolts carry sleeves 38 upon which are mounted spring brackets 39, and U-shaped contact brackets 40 and 41. Brackets 39, 40, and 41 are insulated from each other and from sleeves 38. Brackets 40 and 41 are also tied together by members 42 of insulating material. By virtue of this construction brackets 39, 40 and 41 constitute a frame mounted for longitudinal adjustment upon the magnet frame 25.

Spring brackets 39 support springs 43, the tongues 39ª of brackets 39 engaging notches 43ª in said springs 43 to prevent displacement thereof. Springs 43 support armature 44 which carries contacts 46 and 47. Contacts 48 and 49 are mounted upon screws 50 having screw threaded engagement with brackets 40 and 41 respectively, and locked in position by nuts 50ª. Contacts 48 and 49 are arranged to coöperate with contacts 46 and 47 respectively.

A magnet core 60 is pivoted by means of bracket 61 upon the frame 25 and carries a magnet coil 62 one end of which is grounded at 63 upon the frame 25 and the other end connected with a contact plate 64 mounted upon magnet core 60 but insulated therefrom and carrying a contact 65 which coöperates with contact 66 mounted on a contact bracket 67 carried by frame 25 but insulated therefrom. A spring 68 mounted on plate 64 coöperates with a stop bracket 68ª and serves normally to maintain contacts 65 and 66 out of engagement.

Figure 4:
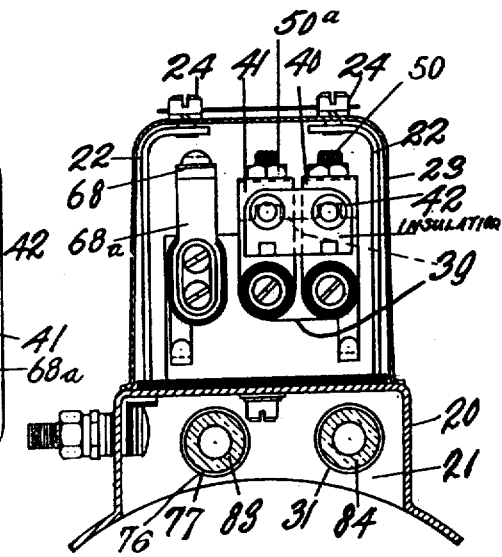
Fig. 4 is a side view thereof showing a section of the housing.
Figure 8:
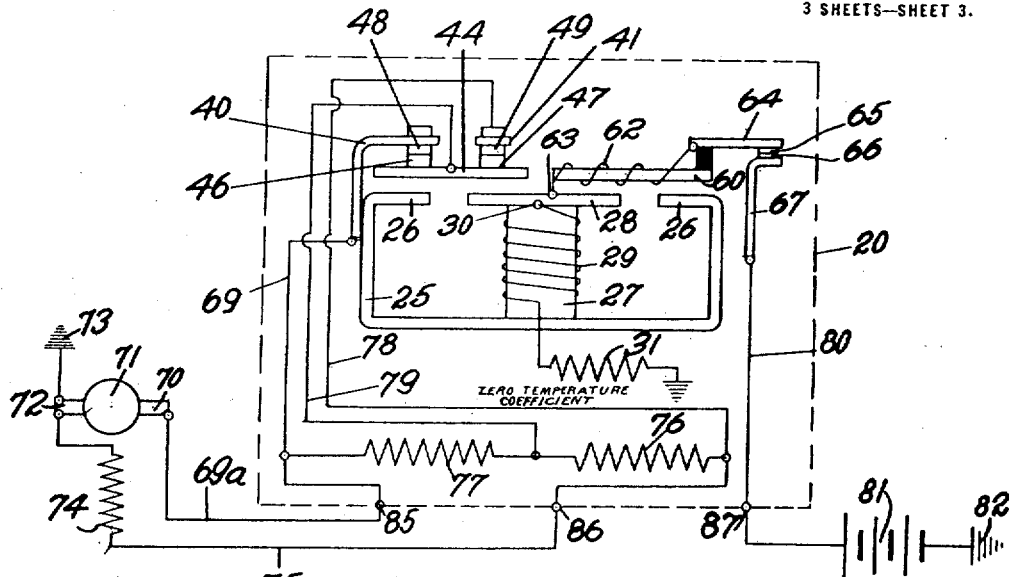
Fig. 8 is a wiring diagram of the form of the invention shown in Figs. 1, 2, 3 and 4, the representation of the relay regulator being merely diagrammatic.
Figure 9:
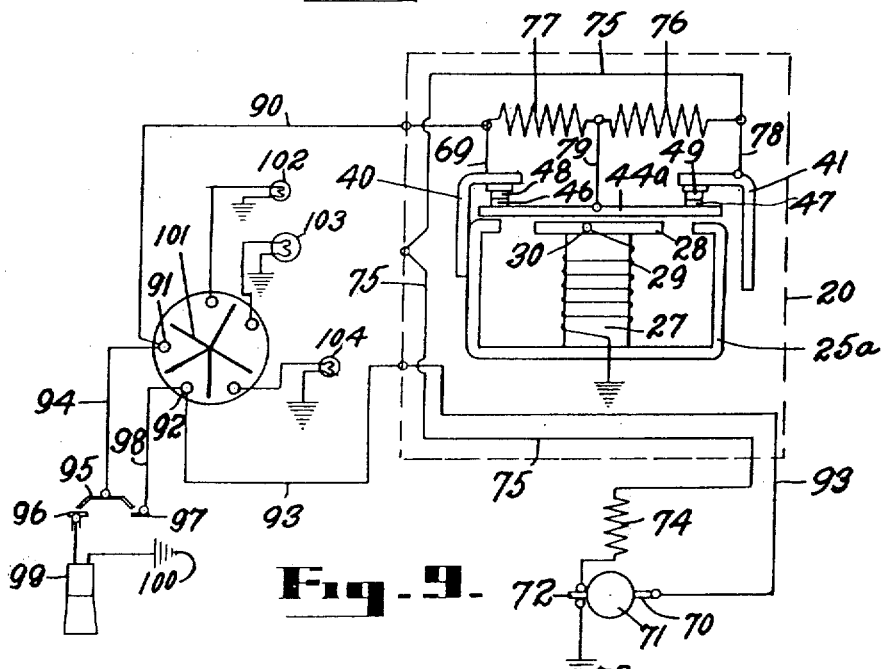
Fig. 9 is a wiring diagram of the form of the invention shown in Figs. 5, 6 and 7.

Referring to Fig. 8, it will be seen that contact bracket 40 is connected by means of wires 69 and 69ª with brush 70 of generator 71, the opposite brush 72 being grounded at 73 on the generator frame. The generator field circuit leads from brush 72 to shunt field winding 74, through wire 75 to resistance coils 76 and 77, and back through wire 69ª to brush 70. The short circuit around resistance 76 includes wire 78 leading to contact bracket 41, contacts 49 and 47, armature 44, and wire 79 connecting the armature 44 with a point on the generator field circuit between resistance coils 76 and 77. The short circuit around resistance 77 includes wire 79, armature 44, contacts 46 and 48, contact bracket 40 and wire 69. The battery charging circuit includes wire 69ª leading out from brush 70, wire 69, bracket 40 connected with magnet frame 25, magnet coil 62 connected at 63 with frame 25 and leading to contact plate 64, contacts 65 and 66, bracket 67, wire 80, battery 81, and ground connection 82 to 73 to brush 72. The voltage coil circuit includes magnet coil 29 connected at 30 with one side of the generator line, and non-temperature coefficient resistance 31 grounded on the other side of the line. Referring to Fig. 4, coils 77 and 76 are mounted on core 83, and coil 31 is mounted on core 84, said cores 83 and 84 being supported by base 20 in the recess 21. The base 20 also carries terminals 85, 86 and 87 which are connected inside the base 20 and housing 23 with various parts of the regulator as shown by the diagram in Fig. 8, and outside the base with the generator and battery.

The operation of the device shown in Figs. 1, 2, 3, 4 and 8 is as follows: When the generator is operated, the current flowing across the line through coil 29 will cause a magnetic field to be created in magnet frame 25 core 27 and pole pieces 26 and 28. If the voltage across the line exceeds a predetermined value, the magnetic field will become strong enough to attract armature 44 against the force exerted by springs 43 causing the separation of either of the pairs of contacts 47 and 49 or 46 and 48, and thereby causing the interruption of either of the short circuits around resistance coil 76 or resistance coil 77, respectively. In this event, the current in the field winding 74 will be reduced causing the voltage across the line to decrease to normal value and the return of the armature 44 to contact making position to permit the normal flow of current through the field circuit.

In order that either of the resistances 76 or 77 may be put into operation successively and not both at the same time, it is necessary that the armature be placed in such a position that either of the pairs of contacts 46 and 48 or 47 and 49 be separated ahead of the other. This may be accomplished by adjusting the position of the armature 44 so that one side thereof is located a little closer to the magnet than the other. This adjustment is accomplished by unloosening the screws 36 and tilting the frame 40 slightly with respect to the magneto. By adjusting screws 50 the pressure between the pairs of contacts may be equalized.

By loosening the screws 50 the contacts 48 and 49 will be raised sufficiently so that the armature 44 and its resilient spring support 43 may be lifted bodily from the supporting members 39 and readily removed from the controller for inspection of the contact points.

It will be observed that by virtue of the construction and arrangement of magnet frame 25 and core 27, a division of the magnetic path is obtained whereby different portions of the flux pass through parallel paths in the armature 44. By thus once dividing the path the cross sectional area of the armature and consequently the mass of the armature can be reduced to one-half the value necessary where there is no division of the flux. It is obvious that by further division of the flux into separate paths through the armature, an armature of still smaller cross sectional area could be used to carry the small total amount of magnetic energy. Reduction of the mass of the armature results in reduction of the magneto-motive-force necessary to overcome its inertia, hence the armature will be much more sensitive to small variations in energizing force. It will also be observed that the air gap area is made as large as possible in order to obtain the most vigorous actions upon the armature with a given amount of expended energy.

The magnetic field described will also cause the attraction of magnet core 60 to close the battery charging circuit through contacts 65 and 66, permitting the passage of current through coil 62 which is wound in a manner with respect to coil 29 such as to cause the creation of a magnetic field in core 60 of a polarity which will assist the field created by coil 29 in maintaining contacts 65 and 66 in closed position while current is flowing from the generator to the battery. When the battery exceeds a predetermined charge, or when the generator stops a reversal of current in coil 62 will tend to take place, thereby tending to cause a reversal of polarity of the field in core 60 which will oppose the field created by coil 29, and will result in a quick repulsion of core 60 and the separation of contacts 65 and 66 interrupting the battery charging circuit.

It is apparent that there has been provided a device including means for regulating the output of the generator in regard to constancy of voltage, and means for controlling the delivery of current to a work circuit, depending, in this case, upon the amount of charge to be given to a storage battery included in the work circuit.

Referring to Figs. 5, 6, 7 and 9 in which a modified form of the invention is shown, but with the device for interrupting the work circuit omitted, the elements of the regulating device for controlling output of the generator are exactly the same as in the first form of the invention, with the exception that elements 25ª, 42ª and 83ª are slightly different in form from corresponding elements 25, 42 and 83. Instead of being placed in a recess in the base 20, the core 83ª upon which the resistance coils 76 and 77 are wound is mounted upon the magnet frame 25ª by means of members 42ª which serve to tie together the contact brackets 40 and 41 in the same relation as in the first form shown in Fig. 4. The generator field circuit includes shunt field winding 74 connected with brush 72 of the generator, wire 75, wire 78, bracket 41, contacts 49 and 47, armature 44ª, contacts 46 and 48, wire 69 and wire 90, switch contacts 91 and 92 which are bridged in manner to be described, and wire 93 leading to brush 70. The field contacts 91 and 92 are bridged by means of horn circuit including wire 94, switch element 95 adapted to contact with switch contacts 96 and 97, and wire 98; or switch contacts 91 and 92 may be bridged by means of switch element 101. The closing of switch element 95 with switch contacts 96 and 97 closes the generator field circuit and also connects the generator with horn 99 which is grounded at 100. The moving of switch element 101 into contact with switch contacts 91 and 92 also causes the connecting up to the generator of lamps 102, 103 and 104. It will be apparent from description of the diagram shown in Fig. 9, that when neither the lamps nor the horn are connected with the generator the field circuit will be interrupted and the generator will be running light. When it is desired to sound the horn without lighting the lights, the switch 95 is closed to effect the closing of the field circuit and to cause the generator to build up and deliver current to the horn.

The short circuits around resistance coils 76 and 77 are the same as the corresponding circuits shown in Fig. 8. Aside from the fact that the current delivery controlling feature has been omitted, the operation of this form of the invention is exactly the same as the operation of the first form shown in Figs. 1, 2, 3, 4 and 8, and no further description is considered necessary.

While the forms of the invention described and illustrated constitute a preferred embodiment thereof, it is to be understood that other forms of the invention might be adopted, such as would fall within the scope of the claims which follow.

What I claim is as follows:

1. In a controlling device, the combination with an electromagnet including a winding and a core; a frame slidable axially with respect to the core and tiltable relatively thereto; an armature resiliently supported by said frame; spaced movable contacts supported by the armature; and stationary contacts supported by said frame.

2. In a controlling device, the combination with an electromagnet including a winding and a core; an armature carrying spaced contacts; means for resiliently supporting said armature and capable of adjustment relatively to said core to cause one portion of the armature to be nearer to the core than another portion, but without changing the air gap area; spaced movable contacts supported by the armature; and stationary contacts supported by said means.

3. In a controlling device, the combination with an electromagnet including a winding and a U-shaped frame providing pole pieces; an inverted U-shaped frame carrying spaced stationary contacts; means for adjustably mounting said frame upon the magnet frame, said means permitting tilting said frame with respect to the magnet frame; and an armature carrying spaced movable contacts resiliently supported by said second frame.

4. In a controlling device, the combination with a plurality of pairs of coöperating relatively stationary and movable contacts in an electric circuit; of an electromagnet including a U-shaped frame and a magnet core supporting a winding, and pole pieces carried by the side members of the frame and by the core, the outer surfaces of the pole pieces being in the same plane; an inverted U-shaped supporting frame adjustably mounted with respect to the U-shaped magnet frame and mounted to slide axially of said core and tiltable relatively thereto; devices for adjustably mounting the stationary contacts upon the supporting frame; an armature located adjacent all of the pole pieces and carrying the movable contacts; and separate leaf springs having their ends resting on the supporting frame and their central portions secured to the armature, and adapted to hold the pairs of contacts normally in engagement.

5. In a controlling device of the vibratory type, the combination with a pair of coöperating contacts, the one movable relative to the other for controlling an electrical circuit; of resilient means for maintaining the contacts normally in engagement; an electromagnet having a core arranged to provide more than two pole faces; and an armature of relatively small mass for actuating the movable contact, and supported adjacent said pole faces, said armature and core coöperating to provide a plurality of magnetic paths through said armature to permit the use of an armature having relatively small inertia, the area of each of the pole faces being made relatively large so that the width of the air gaps between the armature and pole faces may be relatively great, whereby the vibratory action of the armature for a given amount of energy expended in the magnet will be relatively vigorous.

6. In a controlling device, the combination with two pairs of coöperating contacts for controlling electrical circuits, one contact of each pair being movable relative to the other; of an electro-magnet; an armature upon which the movable contacts are mounted adjacent opposite edges of the armatures; adjustable means for supporting the armature so that one edge thereof may be located closer to the magnet than another whereby one pair of contacts may be separated before another pair; and means for adjusting the stationary contacts.

7. In a controlling device, the combination with a plurality of pairs of coöperating contacts for controlling electrical circuits; one contact of each pair being movable relative to the other; of an electro-magnet; an armature supporting the movable contacts; and adjustable means for supporting the armature so that one portion thereof may be located closer to the magnet than another whereby one pair of contacts may be separated before another pair, said supporting means including yielding provisions for maintaining said contacts normally in engagement.

8. In a controlling device, the combination with a plurality of pairs of coöperating contacts for controlling electrical circuits, one contact of each pair being movable relative to the other; of an electro-magnet; an armature supporting the movable contacts; and adjustable means for supporting the armature so that one portion thereof may be located closer to the magnet than another whereby one pair of contacts may be separated before another pair, said supporting means including yielding provisions for maintaining said contacts normally in engagement; and means for adjusting the stationary contacts relative to the movable contacts.

9. In a controlling device, the combination with a pair of coöperating relatively stationary and movable contacts for controlling an electrical circuit; an electro-magnet; an armature carying the movable contact; resilient supporting means for the armature; a frame carrying said resilient support, said resilient means coöperating with said frame to maintain the contacts normally in engagement and the resilient means in position upon the frame; and adjustable means supporting the stationary contact, and capable of movement so as to permit the removal of the armature and resilient support from the frame without removal of the frame from the controlling device.

10. In a controlling device, the combination with an electromagnet; an armature carrying a movable contact; a leaf spring having notched ends attached intermediate its ends to said armature spaced spring supporting brackets having tongues for coöperating with said notches; a support having a stationary contact adjustably mounted thereon, the engagemnt of said contacts retaining said spring in position upon the supporting brackets.

In testimony whereof I affix my signature.
JAMES B. REPLOGLE.

Witnesses:
L. L. HOSIER,
HAZEL M. WEAVER.